(12) United States Patent
Vook et al.

(10) Patent No.: US 6,912,195 B2
(45) Date of Patent: Jun. 28, 2005

(54) FREQUENCY-DOMAIN MIMO PROCESSING METHOD AND SYSTEM

(75) Inventors: Frederick W. Vook, Scahumburg, IL (US); Timothy A. Thomas, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 123 days.

(21) Appl. No.: 10/032,602

(22) Filed: Oct. 28, 2001

(65) Prior Publication Data

US 2003/0095573 A1 May 22, 2003

(51) Int. Cl.$^7$ .............................. H04J 11/00; H04L 1/22
(52) U.S. Cl. ....................... 370/208; 370/330; 375/267; 375/347
(58) Field of Search ................................. 370/203, 208, 370/210, 310, 319, 321, 330, 344; 375/267, 299, 346, 347, 269, 278, 285, 296

(56) References Cited

U.S. PATENT DOCUMENTS

| | | | | |
|---|---|---|---|---|
| 5,481,570 | A | * | 1/1996 | Winters ....................... 375/347 |
| 5,550,872 | A | * | 8/1996 | Liberti et al. ................ 375/347 |
| 5,561,667 | A | * | 10/1996 | Gerlach ....................... 370/286 |
| 5,754,942 | A | * | 5/1998 | Wachs ............................ 455/9 |
| 5,796,779 | A | * | 8/1998 | Nussbaum et al. .......... 375/267 |
| 6,377,631 | B1 | * | 4/2002 | Raleigh ....................... 375/299 |
| 6,473,467 | B1 | * | 10/2002 | Wallace et al. ............. 375/267 |
| 6,487,253 | B1 | * | 11/2002 | Jones et al. .................. 375/260 |
| 6,493,674 | B1 | * | 12/2002 | Takamizawa ................ 704/501 |

FOREIGN PATENT DOCUMENTS

FR      1 158 716    * 11/2001

OTHER PUBLICATIONS

Lawerence R. Rabiner–Beranard Gold, "Theory and Application of Digital Signal Processing"; Bell Telephone Laboratories, Inc. 1975; Prentice–Hall, Inc. Englewood Cliffs, New Jersy; pp. 50–56, 105–106, 357–359.*

B.P. Lathi "Modern Digital and Analog Communication Systems" Oxford University Press, Inc. 1998; $3^{rd}$ ed. pp. 323–325.*

Martin V. Clark, "*Adaptive Frequency–Domain Equalization and Diversity Combining for Broadband Wireless Communications,*" IEEE Journal on Selected Areas in Communications, vol. 16, No. 8, Oct. 1998, pp. 1385–1395.

(Continued)

*Primary Examiner*—John Pezzlo
*Assistant Examiner*—Saba Tsegaye
(74) *Attorney, Agent, or Firm*—Kenneth A. Haas

(57) ABSTRACT

A communication system based upon frequency-domain MIMO processing is disclosed. A transmitting device of the communication system transforms time-domain signals into frequency-domain signals, and weights each frequency-domain signal to form weighted frequency-domain signals with each weighted frequency-domain signal being a function of each frequency-domain signal. The transmitting device transmits weighted time-domain waveforms as a function of the weighted frequency-domain signals. In response thereto, a receiving device of the communication system provides frequency-domain samples that are a function of the one or more weighted time-domain waveforms and weights each frequency-domain sample to form one or more weighted frequency-domain samples with each weighted frequency-domain sample being a function of each frequency-domain sample. The receiving device decodes the weighted frequency-domain sample to obtain the information represented by the time-domain signals.

6 Claims, 4 Drawing Sheets

OTHER PUBLICATIONS

James K. Cavers, "*Single–User and Multiuser Adaptive Maximal Ratio Transmission for Rayleigh Channels*," IEEE Transactions on Vehicular Technology, vol. 49, No. 6, Nov. 2000, pp. 2043–2050.

Hemanth Sampath and Arogyaswami J. Paulraj, "*Joint Transmit and Receive Optimization for High Data Rate Wireless Communication Using Multiple Antennas*," Proceedings of the Thirty–Third Asilomar Conference, vol. 1. Oct. 1999, pp. 215–219.

Gregory G. Raleigh and John M. Coiffi, "*Spatio–Temporal Coding for Wireless Communication*," IEEE Transactions on Communications, vol. 46, No. 3, Mar. 1998, pp. 357–366.

* cited by examiner

US 6,912,195 B2

FREQUENCY-DOMAIN MIMO PROCESSING METHOD AND SYSTEM

FIELD OF THE INVENTION

In general, the present invention relates to the field of multiple input-multiple output ("MIMO") communication systems. More specifically, the present invention relates to increasing the link capacity of broadband wireless single carrier systems operating in a high delay-spread channel.

BACKGROUND OF THE INVENTION

Both single data-stream array processing methods and multiple data stream methods as known in the art are utilized for purposes of increasing the link capacity of narrowband single carrier communication systems and orthogonal frequency division multiplexing ("OFDM") systems. Various methodologies require the transmit array to have knowledge of the channel response between each transmit antenna element and each receive antenna element, and are therefore referred to as "closed-loop" MIMO. Conversely, prior art transmission methods that do not require channel knowledge at the transmit array are referred to as "open-loop" MIMO. Theoretically, the benefits of having perfect channel knowledge versus not having any channel knowledge at the transmit array are obtained mainly at low signal-to-noise ratios and in correlated channels. The higher link capacities obtained when channel knowledge is present, however, translate into significant capacity gains on the system level.

A Cyclic-Prefix single carrier ("CP-single carrier") system known in the art is characterized by the insertion of an OFDM-style cyclic prefix into a sequence of time-domain data symbols. It is well known that the cyclic prefix facilitates the application of frequency-domain equalization and receive array processing methodologies at a receiving device having one or more antennas. Many benefits of frequency-domain equalization and cyclic prefixes have been acquired. However, the idea of applying a MIMO methodology to cyclic prefix-based single carrier systems is absent from the prior art. The present invention addresses this situation.

SUMMARY OF THE INVENTION

One form of the invention is a method of operating a transmitting device having one or more transmission branches with each transmission branch receiving a time-domain signal. First, each time-domain signal is transformed into a frequency-domain signal. Second, each frequency-domain signal is weighted to form one or more weighted frequency-domain signals with each weighted frequency-domain signal being a function of each frequency-domain signal.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 4:
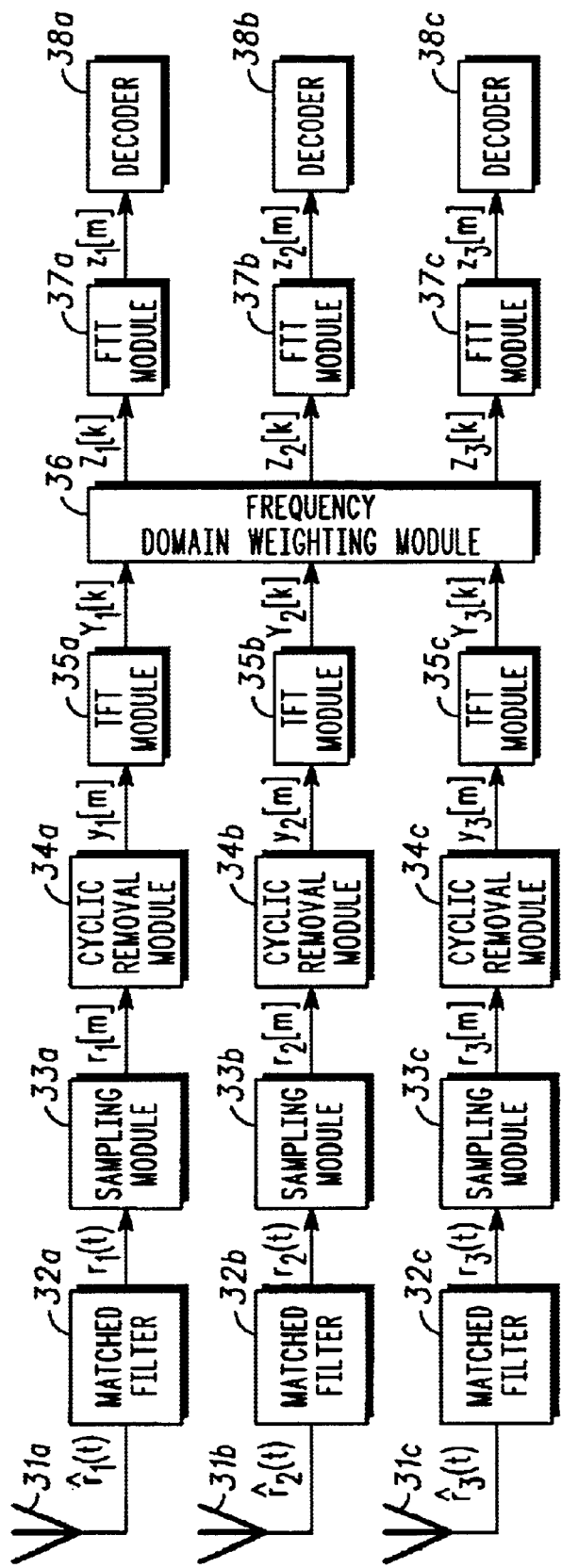
FIG. 4 illustrates one embodiment of a linear MIMO receiving device for a cyclic-prefix single-carrier system in accordance with the present invention.

The present invention is a method for incorporating multiple-stream array processing techniques in single carrier systems comprising a transmitting device having $M_T$ transmit antennas (e.g., a transmitting device 20 illustrated in FIG. 2 where $M_T=3$) and a receiving device having $M_R$ receive antennas (e.g., a receiving device 30 illustrated in FIG. 4 where $M_R=3$). Such methods can employ cyclic redundancy (i.e., cyclic prefixes, cyclic postfixes, or a mixture thereof).

Figure 1:
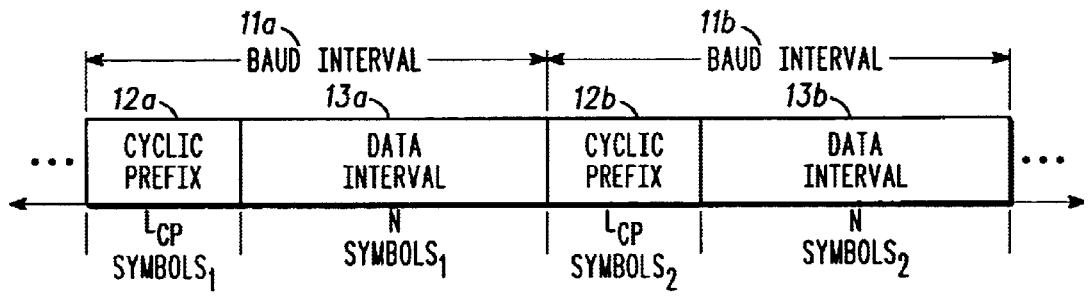
FIG. 1 illustrates one embodiment of a timing diagram of a cyclic-prefix-based single-carrier system in accordance with the present invention.

FIG. 1 illustrates a time line wherein the time domain is divided up into a baud interval 11a, a baud interval 11b, and others baud intervals not shown. Each illustrated baud interval consists of a cyclic redundancy of $L_{cp}$ symbols, such as a cyclic prefix 12a of $L_{cp}$ symbols, and a cyclic prefix 12b of $L_{cp}$ symbols$_2$. In other embodiments of baud intervals, other forms of cyclic redundancy can be used, such as, for example, cyclic postfix and a mixture of a cyclic prefix and a cyclic postfix. Each baud interval further consists of a data interval of N symbols (N>1), such as a data interval 13a of N symbols$_1$ and a data interval 13b of N symbols$_2$. The $L_{cp}$ symbols of each cyclic prefix are simply a repetition of the last $L_{cp}$ symbols of a corresponding data interval. Within a given baud interval, the goal of a transmitting device of the present invention (e.g., transmitting device 20) is to deliver $N_s$ sequences of N symbols (e.g., Quadrature Amplitude Modulation ("QAM") symbols or Phase-Shift Keying ("PSK") symbols) within each baud interval. The $m^{th}$ time-domain symbol of the $j^{th}$ stream is denoted $s_j[m]$, for $j=1 \ldots N_s$, and $m=0 \ldots N-1$. The symbols of the $N_s$ streams can belong to a traditional QAM or PSK constellation, time-domain chips in a CDMA system, or other weighted time-domain signals as known in the art.

Figure 2:
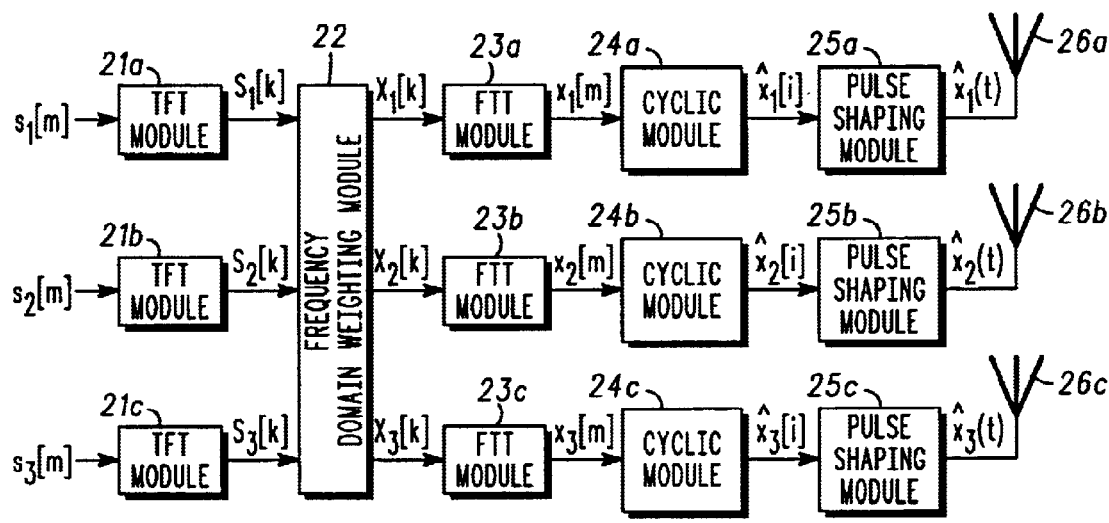
FIG. 2 illustrates one embodiment of a closed-loop MIMO transmitting device for a cyclic-prefix single-carrier system in accordance with the present invention.

FIG. 2 illustrates transmitting device 20 operating in accordance with the present invention. Transmitting device 20 has three branches for processing a time-domain signal $s_1[m]$, a time-domain signal $s_2[m]$, and a time-domain signal $s_3[m]$ (i.e., $M_T=3$ and $N_S=3$). A following operational description on of transmitting device 20 involves baud interval 11a (FIG. 1). As a result, in the following operational description of transmitting device 20, the dependencies of the mathematical quantities on a particular baud interval are omitted for clarity. Furthermore, from the following operational description of transmitting device 20, those having ordinary skill in the art will appreciate alternative embodiments of a transmitting device in accordance with the present invention for processing any number of streams (i.e., $1 \leq N_s < \infty$) with any number of transmit antennas $M_T$.

Transmitting device 20 includes a Time-Frequency Transformer ("TFT") module 21a, a TFT module 21b, and a TFT module 21c. TFT module 21a, TFT module 21b, and TFT module 21c transform time-domain signal $s_1[m]$, time-domain signal $s_2[m]$, and time-domain signal $s_3[m]$, respectively, into frequency-domain signals of a continuous nature or a discrete nature. In one embodiment, TFT module 21a, TFT module 21b, and TFT module 21c are Fast Fourier Transform ("FFT") based modules for implementing the following equation [1] in transforming time-domain signal $s_1[m]$, time-domain signal $s_2[m]$, and time-domain signal $s_3[m]$, respectively, into a frequency-domain signal $S_1[k]$, a frequency-domain signal $S_2[k]$, and a frequency-domain signal $S_3[k]$, respectively:

$$S_j[k] = \sum_{m=0}^{N-1} s_j[m]e^{-j2\pi km/N} \quad [1]$$

where $S_j[k]$ is the frequency-domain symbol on the $k^{th}$ frequency bin (or subcarrier) for the $j^{th}$ stream, where k=0 ... N−1, and N is the FFT size.

Figure 3:
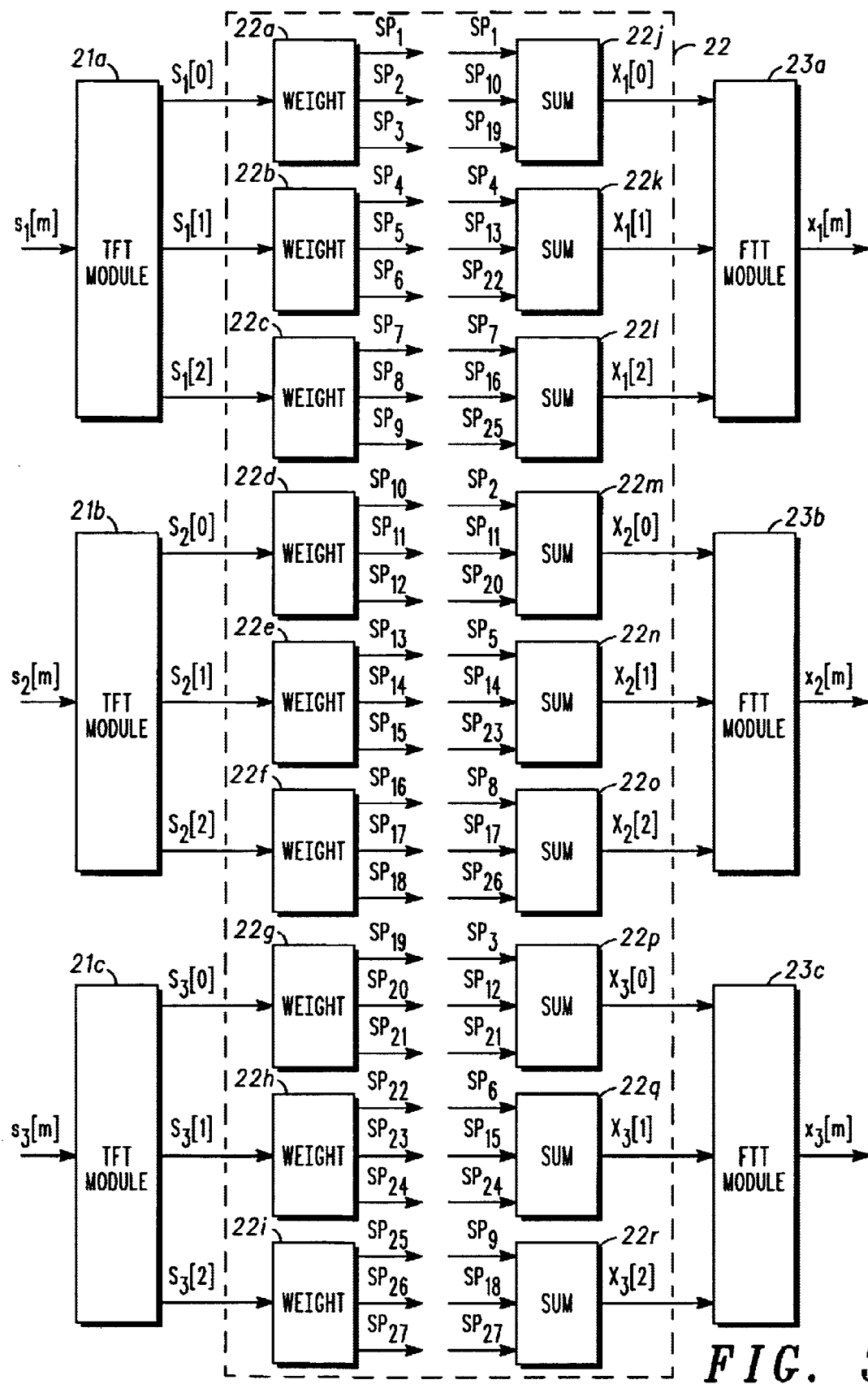
FIG. 3 illustrates one embodiment of a frequency-domain weighting module for the closed loop MIMO transmitting device of FIG. 1.

Once in the frequency-domain, the transmit array processing required by MIMO is carried out on each frequency bin by a frequency-domain weighting module 22. Specifically, frequency-domain weighting module 22 provides a weighted frequency-domain signal $X_1[k]$, a weighted frequency-domain signal $X_2[k]$, and a weighted frequency-domain signal $X_3[k]$, each being a function of frequency-domain signal $S_1[k]$, frequency-domain signal $S_2[k]$, and frequency-domain signal $S_3[k]$. In one embodiment, as illustrated in FIG. 3, frequency-domain weighting module 22 receives frequency-domain signal $S_1[k]$, frequency-domain signal $S_2[k]$, and frequency-domain signal $S_3[k]$ on the $k^{th}$ subcarrier in an $N_s \times 1$ vector according to the following equation [2]:

$$S[k] = \begin{bmatrix} S_1[k] \\ S_2[k] \\ \vdots \\ S_{N_s}[k] \end{bmatrix} \quad [2]$$

where k=0 ... N−1, and where $N_s=3$.

Accordingly, TFT module 21a implements a serial-to-parallel conversion of the time-domain signal $s_1[m]$ (m=0 ... N−1) to a frequency-domain signal $S_1[0]$, a frequency-domain signal $S_1[1]$, and a frequency-domain signal $S_1[2]$. TFT module 21b implements a serial-to-parallel conversion of the time-domain signal $s_2[m]$ (m=0 ... N−1) to a frequency-domain signal $S_2[0]$, a frequency-domain signal $S_2[1]$, and a frequency-domain signal $S_2[2]$. TFT module 21c implements a serial-to-parallel conversion of the time-domain signal $s_3[m]$ (m=0 ... N−1) to a frequency-domain signal $S_3[0]$, a frequency-domain signal $S_3[1]$, and a frequency-domain signal $S_3[2]$. In this FFT embodiment, the FFT size N (which in most embodiments is equal to the number of symbols in a data interval 13a) is shown to be 3, although, as will be appreciated by those skilled in the art, N can take on other values such as 512 or 1024.

In response thereto, for each subcarrier k of the N subcarriers, frequency-domain weighting module 22 provides $M_T$ weighted frequency-domain signals $X_j[k]$, j=1 ...

$M_T$, which are collected into the $M_T \times 1$ vector $X[k]$ in accordance with the following equation [3]:

$$X[k] = \begin{bmatrix} X_1[k] \\ X_2[k] \\ \vdots \\ X_{M_T}[k] \end{bmatrix} \quad [3]$$

As shown in FIG. 3, the number of antennas $M_T$ is shown to be 3, although it will be appreciated by those skilled in the art that $M_T$ can take on other values that are, for example, not necessarily equal to the number of streams $N_s$. In most embodiments, $M_T$ is chosen to be greater than or equal to $N_s$. A Frequency-Time Transformer ("FTT") module 23a receives a weighted frequency-domain signal $X_1[k]$ for k=0 ... N−1 (i.e., $X_1[0]$, $X_1[1]$ and $X_1[2]$). An FTT module 23b receives a weighted frequency-domain signal $X_2[k]$ for k=0 ... N−1 (i.e., $X_2[0]$, $X_2[1]$ and $X_2[2]$). An FTT module 23c receives a weighted frequency-domain signal $X_3[k]$ for k=0 ... N−1 (i.e., $X_3[0]$, $X_3[1]$ and $X_3[2]$).

In one embodiment, frequency-domain weighting module 22 includes a plurality of weight modules 22a–22i and a plurality of sum devices 22j–22r for providing the vector $X[k]$ by a weighting of the frequency-domain signals $S_1[0]$ –$S_3[2]$ in accordance with the following equation [4]:

$$X[k] = V[k]S[k] = \sum_{l=1}^{N_s} V_l[k]S_l[k] \quad [4]$$

where the $M_T \times 1$ vector $X[k]$ is as in equation [3]; where the $N_s \times 1$ vector $S[k]$ is as in equation [2]; where the $M_T \times 1$ transmit weight vector for the $l^{th}$ stream is given by $V_l[k]$ in accordance with the following equation [5]:

$$V_l[k] = \begin{bmatrix} V_{1l}[k] \\ V_{2l}[k] \\ \vdots \\ V_{M_T l}[k] \end{bmatrix} \quad [5]$$

and the $N_s$ transmit vectors are arranged into a transmit matrix $V[k]$ in accordance with the following equation [6]:

$$V[k]=[V_1[k]\ V_2[k]\ldots V_{N_s}[k]] \quad [6]$$

where, as illustrated in FIG. 3, a plurality of signal paths SP1–SP27 are arranged between weight units 22a–22i and sum units 22j–22r in accordance with equations [4], [5], and [6].

FTT module 23a converts weighted frequency-domain signals $X_1[0]$, $X_1[1]$, and $X_1[2]$ into a weighted time-domain signal $x_1[m]$, for m=0 ... N−1. FTT module 23b converts weighted frequency-domain signals $X_2[0]$, $X_2[1]$, and $X_2[2]$ into weighted time-domain signal $x_2[m]$, for m=0 ... N−1. FTT module 23c converts weighted frequency-domain signals $X_3[0]$, $X_3[1]$ and $X_3[2]$ into a weighted time-domain signal $x_3[m]$, for m=0 ... N−1. In one embodiment, FTT module 23a, FTT module 23b, and FTT module 23c are inverse FFT based modules whereby weighted time-domain signals $x_1[m]$, $x_2[m]$, and $x_3[m]$ are determined in accordance with the following equation [7]:

$$x_j[m] = \frac{1}{N}\sum_{k=0}^{N-1} X_j[k] e^{+j2\pi km/N} \quad [7]$$

At this point, the quantities $v_{jl}[m]$, m=0 ... N−1, are defined to be the time-domain equivalent representation of the frequency-domain transmit weights $v_{jl}[k]$, k=0 ... N−1, j=1 ... $M_T$, l=1 ... $N_s$, in accordance with the following equation [8]:

$$v_{jl}[m] = \frac{1}{N}\sum_{k=0}^{N-1} V_{jl}[k] e^{+j2\pi km/N} \quad [8]$$

It can then be shown that the weighted time-domain signals $x_1[m]$, $x_2[m]$, and $x_3[m]$ of Equation [7] are given by the following equation [9]:

$$x_j[m] = \sum_{l=1}^{N_s}\sum_{p=0}^{N-1} v_{jl}[p] s_l[(m-p)\bmod N] \quad [9]$$

As shown in equation [9], the time-domain data is the convolution of the time-domain equivalent transmit weights and the $N_s$ data streams.

A cyclic module 24a adds a cyclic redundancy in the form of a cyclic prefix to weighted time-domain signal $x_1[m]$ to form a weighted redundant time-domain signal $\hat{x}_1[i]$. A cyclic module 24b adds a cyclic redundancy in the form of a cyclic prefix to weighted time-domain signal $x_2[m]$ to form a weighted redundant time-domain signal $\hat{x}_2[i]$. A cyclic module 24c adds a cyclic redundancy in the form of a cyclic prefix to weighted time-domain signal $x_3[m]$ to form a weighted redundant time-domain signal $\hat{x}_3[i]$. In one embodiment, weighted redundant time-domain signals $\hat{x}_1[i]$, $\hat{x}_2[i]$, $\hat{x}_3[i]$ are formed in accordance with the following equation [10]:

$$\hat{x}_j[i] = \begin{cases} x_j[i+N-L_{cp}], & 0 \le i \le L_{cp}-1 \\ x_j[i-L_{cp}], & L_{cp} \le i \le N+L_{cp}-1 \end{cases} \quad [10]$$

In an alternative embodiment, cyclic module 24a adds a cyclic redundancy in the form of a cyclic postfix to weighted time-domain signal $x_1[m]$ to form weighted redundant time-domain signal $\hat{x}_1[i]$. A cyclic module 24b adds a cyclic redundancy in the form of a cyclic postfix to weighted time-domain signal $x_2[m]$ to form weighted redundant time-domain signal $\hat{x}_2[i]$. A cyclic module 24c adds a cyclic redundancy in the form of a cyclic postfix to weighted time-domain signal $x_3[m]$ to form weighted redundant time-domain signal $\hat{x}_3[i]$. In one embodiment, weighted redundant time-domain signals $\hat{x}_1[i]$, $\hat{x}_2[i]$, and $\hat{x}_3[i]$ having cyclic postfixes are formed in accordance with the following equation [11]:

$$\hat{x}_j[i] = \begin{cases} x_j[i], & 0 \le i \le N-1 \\ x_j[i-N], & N \le i \le N+L_{cp}-1 \end{cases} \quad [11]$$

In another alternative embodiment, cyclic module 24a adds a cyclic redundancy in the form of a combined cyclic prefix and cyclic postfix to weighted time-domain signal $x_1[m]$ to form weighted redundant time-domain signal $\hat{x}_1[i]$. A cyclic module 24b adds a cyclic redundancy in the form of a combined cyclic prefix and cyclic postfix to weighted time-domain signal $x_2[m]$ to form weighted redundant time-domain signal $\hat{x}_2[i]$. A cyclic module 24c adds a cyclic redundancy in the form of a combined cyclic prefix and cyclic postfix to weighted time-domain signal $x_3[m]$ to form weighted redundant time-domain signal $\hat{x}_3[i]$.

A pulse shaping module 25a shapes weighted redundant time-domain signal $\hat{x}_1[i]$ into a weighted time-domain waveform $\hat{x}_1(t)$. A pulse shaping module 25b shapes weighted time-domain signal $\hat{x}_2[i]$ into a weighted time-domain waveform $\hat{x}_2(t)$. A pulse shaping module 25c shapes weighted time-domain signal $\hat{x}_3[i]$ into a weighted time-domain waveform $\hat{x}_3(t)$. In one embodiment, pulse shaping module 25a, pulse shaping module 25b, and pulse shaping module 25c provides weighted time-domain waveforms $\hat{x}_1(t)$, $\hat{x}_2(t)$, and $\hat{x}_3(t)$, respectively, in accordance with the following equation [12]:

$$\hat{x}_j(t) = \sum_{n=0}^{N+L_{cp}-1} \hat{x}_j[n] p_{sr}(t - nT_s) \quad [12]$$

where $p_{sr}(t)$ is the pulse shaping waveform (which typically has the square-root raised cosine spectrum) and $T_s$ is the duration of a symbol.

Weighted time-domain waveforms $\hat{x}_1(t)$, $\hat{x}_2(t)$, and $\hat{x}_3(t)$ propagate from antenna 26a, antenna 26b, and antenna 26c, respectively, to an antenna 31a, an antenna 31b, and an antenna 31c, respectively, of receiving device 30 through a multipath channel with an RF impulse response in accordance with the following equation [13]:

$$h_{RFij}(t) = \sum_{l=0}^{L-1} h_{ijl} \delta(t-\tau_l) \quad [13]$$

where $h_{ijl}$ and $\tau_l$ are the complex gain for the $j^{th}$ transmit antenna and the $i^{th}$ receive antenna and time delay of the $l^{th}$ path, respectively, and where $\delta(t)$ is a Dirac delta function. This channel impulse response is assumed to be time-invariant during the transmitted block of N data symbols, although the extension of this equation to time-varying channels is straightforward.

FIG. 4 illustrates receiving device 30 operating in accordance with the present invention. Receiving device 30 has three branches (i.e., $M_R$=3) for processing three time-domain waveforms $\hat{r}_1(t)$, $\hat{r}_2(t)$ and $\hat{r}_3(t)$ which are a function of a propagation of the weighted time-domain waveforms $\hat{x}_1(t)$, $\hat{x}_2(t)$, and $\hat{x}_3(t)$, through the channel as would be appreciated by those having ordinary skill in the art. For purposes of describing receiving device 30, cyclic module 24a, cyclic module 24b, and cyclic module 24c as illustrated in FIG. 2 will be viewed as adding cyclic prefixes to weighted time-domain signals $x_1[m]$, $x_2[m]$, and $x_3[m]$, respectively. Also, for clarity, the operation of receiving device 30 will be described with N symbols. However, other embodiments of a receiving device in accordance with the present invention can utilize any multiple of N (e.g., 2N, 3N, etc.). From such description, those having ordinary skill in the art will appreciate that alternative embodiments of a receiving device in accordance with the present invention can have any number of receive antennas $M_R$.

In response to time-domain waveforms $\hat{r}_1(t)$, $\hat{r}_2(t)$ and $\hat{r}_3(t)$, a matched filter 32a, a matched filter 32b, and a matched filter 32c (where in one embodiment, each has an impulse response $p_{sr}(-t)$, where $p_{sr}(t)$ is the impulse response of each of the pulse shaping modules 25a, 25b, and 25c) provide a matched-filtered waveform $r_1(t)$, a matched-filtered waveform $r_2(t)$, and a matched-filtered waveform $r_3(t)$, respectively. In one embodiment, matched-filtered waveform $r_1(t)$, matched-filtered waveform $r_2(t)$, and matched-filtered waveform $r_3(t)$ are determined in accordance with the following equation [14]:

$$r_i(t) = \sum_{j=1}^{M_T} \sum_{n=0}^{N+L_{cp}-1} \hat{x}_j[n] h_{ij}(t - nT_s) + n_i(t) \quad [14]$$

where $h_{ij}(t)$ is the overall impulse response between the weighted redundant time-domain signal $\hat{x}_j[n]$ and the matched-filtered waveform $r_i(t)$ on the $i^{th}$ antenna as would be appreciated by those skilled in the art. In equation [14], $n_i(t)$ is the receiving device noise signal on the $i^{th}$ antenna branch, $h_{ij}(t)$ includes the transmit pulse shaping for transmit antenna j, the received matched filtering for receive antenna i, and the impulse response of the RF channel between the $j^{th}$ transmit and the $i^{th}$ receive antenna is given by the following equation [15]:

$$h_{ij}(t) = \sum_{l=0}^{L-1} h_{ijl} p_{rc}(t - \tau_l) \quad [15]$$

where $p_{rc}(t)$ is the convolution of $p_{sr}(t)$ with $p_{sr}(-t)$, and $p_{rc}(t)$ typically has the raised-cosine spectrum.

After matched-filtering, a sampling module 33a, a sampling module 33b, and a sampling module 33c sample matched-filtered waveform $r_1(t)$, matched-filtered waveform $r_2(t)$, and matched-filtered waveform $r_3(t)$, respectively, at a symbol rate to form a received sequence $r_1[m]$, a received sequence $r_2[m]$, and a received sequence $r_3[m]$, respectively. In one embodiment, received sequence $r_1[m]$, received sequence $r_2[m]$, and received sequence $r_3[m]$ are formed in accordance with the following equation [16] ($0 \le m \le N-1$):

$$r_i[m] = r_i(mT_s) = \sum_{j=1}^{M_T} \sum_{n=0}^{N+L_{cp}-1} \hat{x}_j[n] h_{ij}(mT_s - nT_s) = \sum_{j=1}^{M_T} \sum_{n=0}^{N+L_{cp}-1} \hat{x}_j[n] h_{ij}[m - n] \quad [16]$$

where $h_{ij}[m]$ is defined to be $h_{ij}(mT_s)$ and noise has been neglected.

At each receive branch, the first $L_{cp}$ received samples for each baud interval are discarded, and the remaining N symbols of each block are transformed into the frequency-domain. Accordingly, a cyclic removal module 34a, a cyclic removal module 34b, and a cyclic removal module 34c provide a symbol-spaced sample $y_1[m]$, a symbol-spaced sample $y_2[m]$, and a symbol-spaced sample $y_3[m]$, respectively, where m=0 ... N-1. In one embodiment, symbol-spaced sample $y_3[m]$, symbol-spaced sample $y_2[m]$, and symbol-spaced sample $y_3[m]$ are determined in accordance with the following equation [17]:

$$y_i[m] = \sum_{j=1}^{M_T} \sum_{n=0}^{L_{cp}-1} h_{ij}[n] x_j[m-n] + n_i[m] \quad [17]$$

where m=0 ... N-1, $n_i[m]$ is the sampled noise waveform on the $i^{th}$ receive antenna, and for one embodiment, the following assumptions are made. First, the raised cosine waveform $p_{rc}(t)$ is assumed to be time limited for the interval—$N_p T_s \le t \le N_p T_s$, where $N_p$ is the number of significant "tails" of the raised cosine waveform. Second, in the RF channel response as defined in equation [13] above, the first multipath arrival time is $N_p T_s$, and the maximum multipath arrival time $\tau_L$ is assumed to be no greater than $(L_{cp} - 1 - 2N_p)$ symbol times, where $L_{cp}$ is the length of the prefix. These assumptions imply that $h_{ij}[n] = h_{ij}(nT_s)$ is non-zero only for $0 \le i \le L_{cp} - 1$. As will be appreciated by those skilled in the art, the extension of equation [17] to situations where these assumptions do not hold is straightforward.

In response to symbol-spaced sample $y_1[m]$, symbol-spaced sample $y_2[m]$, and symbol-spaced sample $y_3[m]$, respectively, where m=0 ... N-1, a TFT module 35a, a TFT module 35b, and a TFT module 35c provide a frequency-domain sample $Y_1[k]$, a frequency-domain sample $Y_2[k]$, and a frequency-domain sample $Y_3[k]$, respectively, for k=0 ... N-1. In one embodiment, TFT modules 35a-35c are FFT based modules whereby frequency-domain sample $Y_1[k]$, a frequency-domain sample $Y_2[k]$, and a frequency-domain sample $Y_3[k]$ are determined in accordance with the following equation [18]:

$$Y_i[k] = \sum_{j=1}^{M_T} H_{ij}[k] X_j[k] + N_i[k] \quad \text{where} \quad [18]$$

$$H_{ij}[k] = \sum_{n=0}^{L_{cp}-1} h_{ij}[n] e^{-j2\pi nk/N} \quad [19]$$

$$X_j[k] = \sum_{n=0}^{N-1} x_j[n] e^{-j2\pi nk/N} \quad [20]$$

$$N_i[k] = \sum_{n=0}^{N-1} n_i[n] e^{-j2\pi nk/N} \quad [21]$$

Equation [18] can be concisely written as the following equation [22]:

$$Y[k] = H[k]X[k] + N[k] \quad [22]$$

where the $M_R \times M_T$ channel matrix on subcarrier k is in accordance with the following equations [23] and [24]:

$$H[k] = [H_1[k] \; H_2[k] \; \ldots \; H_{M_T}[k]] \quad \text{and} \quad [23]$$

$$H_l[k] = \begin{bmatrix} H_{1l}[k] \\ H_{2l}[k] \\ \vdots \\ H_{M_R l}[k] \end{bmatrix}, Y[k] = \begin{bmatrix} Y_1[k] \\ Y_2[k] \\ \vdots \\ Y_{M_R}[k] \end{bmatrix}, N[k] = \begin{bmatrix} N_1[k] \\ N_2[k] \\ \vdots \\ N_{M_R}[k] \end{bmatrix} \quad [24]$$

Using equation [4], equation [22] can be rewritten as the following equation [25]:

$$Y[k] = H[k]V[k]S[k] + N[k] \quad [25]$$

For linear receive array processing, a frequency-domain weighting module 36 takes the vector of frequency-domain samples on each subcarrier (as represented in equation [22]) and applies a linear weighting matrix W[k] to form the vector of multiple outputs on each subcarrier in accordance with the following equation [26]:

$$Z[k] = W^H[k]Y[k] = W^H[k]H[k]V[k]S[k] + W^H[k]N[k] \quad [26]$$

Figure 5:
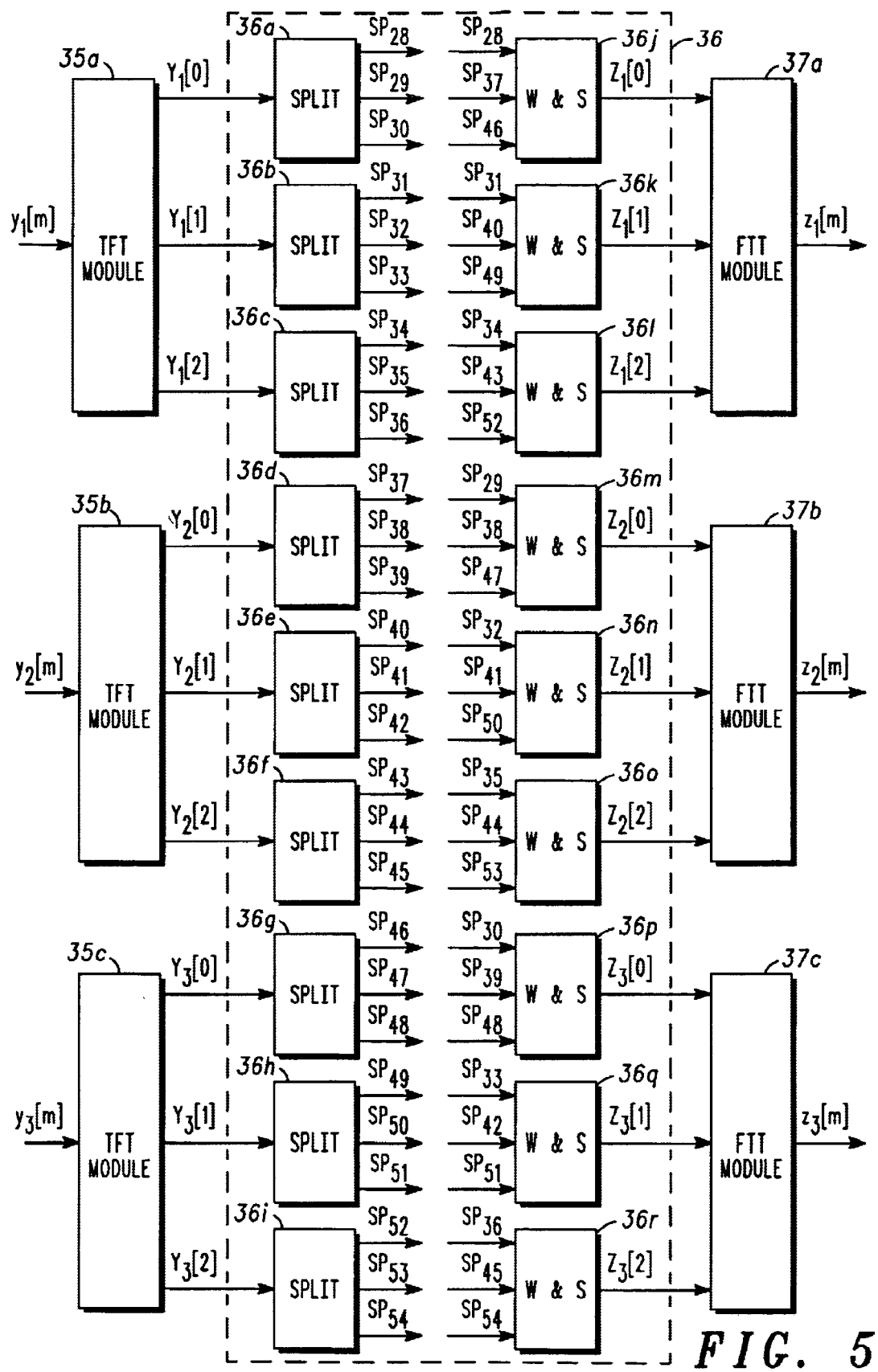
FIG. 5 illustrates one embodiment of a frequency-domain weighting module for the linear MIMO receiving device of FIG. 4.

In one embodiment, as illustrated in FIG. 5, frequency-domain weighting module 36 includes a plurality of split modules 36a-36i and a plurality of weight and sum ("W&S") modules 36j–36r in communication via signal paths SP28–SP54.

A FTT module 37a converts weighted frequency-domain samples $Z_1[0]$, $Z_1[1]$, and $Z_1[2]$ into a weighted time-domain sample $z_1[m]$, for m=0 . . . N−1. A FTT module 37b converts weighted frequency-domain samples $Z_2[0]$, $Z_2[1]$, and $Z_2[2]$ into weighted time-domain sample $z_2[m]$, for m=0 . . . N−1. A FTT module 37c converts weighted frequency-domain samples $Z_3[0]$, $Z_3[1]$ and $Z_3[2]$ into a weighted time-domain sample $z_3[m]$, for m=0 . . . N−1. In one embodiment, FTT module 37a, FTT module 37b, and FTT module 37c are inverse FFT based modules whereby weighted time-domain sample $z_1[m]$, $z_2[m]$, and $z_3[m]$ are determined in accordance with the following equation [27]:

$$z_1[m] = \frac{1}{N}\sum_{k=0}^{N-1} Z_1[k]e^{+j2\pi km/N} \quad [27]$$

A decoder 38a conventionally decodes weighted time-domain sample $z_1[m]$ to derive time-domain signal $s_1[m]$ (FIG. 2). A decoder 38b conventionally decodes weighted time-domain sample $z_2[m]$ to derive time-domain signal $s_2[m]$ (FIG. 2). A decoder 38c conventionally decodes weighted time-domain sample $z_3[m]$ to derive time-domain signal $s_3[m]$ (FIG. 2).

Each module of transmitting device 20 (FIG. 2) and each module of receiving device 30 (FIG. 4) as described may be implemented in hardware (analog or digital), software, or any combination of hardware and software. Those having ordinary skill in the art will appreciate a sequential operation of the modules of transmitting device 20 and the modules of receiving device 30 (e.g., in a software implementation) and a concurrent operation of the modules of transmitting device 20 and the modules of receiving device 30 (e.g., in a hardware implementation).

Numerous methods can be used for picking the transmit weight matrix implemented by frequency-domain weighting module 22 (FIGS. 2 and 3) and the receive weight matrix implemented by frequency-domain weighting module 36 (FIGS. 4 and 5) for frequency flat channels. Such methods can be applied on a subcarrier in the frequency-domain of a cyclic-prefix-based single carrier system. For illustration purposes, several examples for picking the transmit and receive weights are given in the following discussion.

For an arbitrary transmit weight matrix V[k], the MMSE receive weights can be in accordance with the following equation [28]:

$$W[k] = \{H[k]V[k]V^H[k]H^H[k]+\sigma^2 I\}^{-1}H[k]V[k] \quad [28]$$

When channel knowledge is not available to transmitting device 20 (FIG. 2), the transmit weight matrix V[k] can be chosen to be equal to the identity matrix. Another example of choosing the transmit weight matrix is as follows. First, take the singular value decomposition of H[k] in accordance with the following equation [29]:

$$H[k] = U[k]\Sigma[k]Q^H[k] \quad [29]$$

where $\Sigma[k]$ is a diagonal matrix with the singular values of H[k] along the main diagonal. Setting $W(k)=U[k]\Sigma^{-1}$ and $V[k]=Q[k]$, equation [26] becomes the following equation [30]:

$$Z[k] = S[k]+\Sigma^{-1}[k]U[k]N[k] \quad [30]$$

and the channel has effectively been "diagonalized" into parallel non-interfering spatial channels between the input to the transmit array and the input to the receive array. In this embodiment, the transmitter must first be provided channel information such as either H[k] or Q[k]. In one embodiment, the channel matrices H[k] are estimated at the receiving device and then transmitted back to the transmitting device.

The term "signal" was used in the operational description of the transmitting device 20 (FIG. 2) herein and term "sample" was used in the operational description of the transmitting device 20 (FIG. 4) herein for purposes of making a clear distinction between the operational description of transmitting device 20 and the operational description of receiving device 30. However, for purposes of claim construction, the terms "signal" and "sample" are interchangeable.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A transmitting device having one or more transmission branches, each transmission branch receiving a time-domain signal, said transmitting device comprising:

a first set of one or more modules operable to transform each time-domain signal into a frequency-domain signal;

a second set of one or more modules operable to apply a weight to each frequency-domain signal to form one or more weighted frequency-domain signals with each weighted frequency-domain signal being a function of each frequency-domain signal a third set of one or more modules operable to transform each weighted frequency-domain signal into a weighted time-domain signal;

a fourth set of one or more modules operable to add a cyclic redundancy to each weighted time-domain signal to form a corresponding weighted redundant time-domain signal, wherein the cyclic redundancy is according to:

$$\hat{x}_j[i] = \begin{cases} x_j[i+N-L_{cp}], & 0 \le i \le L_{cp}-1 \\ x_j[i-L_{cp}], & L_{cp} \le i \le N+L_{cp}-1 \end{cases}$$

or $$\hat{x}_j[i] = \begin{cases} \hat{x}_j[i], & 0 \le i \le N-1 \\ x_j[i-N], & N \le i \le N+L_{cp}-1 \end{cases}$$

or any combination of the two; and a fifth set of one or more modules operable to transmit the weighted time-domain signal.

2. The transmitting device for claim 1, wherein a transformation of each time-domain signal into a frequency-domain signal is according to:

$$S_j[k] = \sum_{m=0}^{N-1} s_j[m]e^{-j2\pi km/N}.$$

3. The transmitting device for claim 1, wherein a weighting of each frequency-domain signal is according to:

$$X[k] = V[k]S[k] = \sum_{l=1}^{N_S} V_l[k]S_l[k]$$

4. The transmitting device of claim 1, wherein a transformation of each weighted frequency-domain signal into a weighted time-domain signal is according to:

$$x_j[m] = \frac{1}{N}\sum_{k=0}^{N-1} X_j[k]e^{+j2\pi km/N}$$

5. The transmitting device of claim 1, further comprising:
a sixth set of one or more modules operable to shape each weighted redundant time-domain signal into a weighted time-domain waveform.

6. The transmitting device of claim 5, wherein a shaping of each weighted redundant time-domain signal into a weighted time-domain waveform is according to:

$$\hat{x}_j(t) = \sum_{n=0}^{N+L_{cp}-1} \hat{x}_j[n]p_{sr}(t-nT_s)$$

* * * * *